(12) United States Patent
Kosciuszko et al.

(10) Patent No.: US 6,560,593 B1
(45) Date of Patent: May 6, 2003

(54) METHOD AND APPARATUS FOR VIEWING THE EFFECT OF CHANGES TO AN INDEX FOR A DATABASE TABLE ON AN OPTIMIZATION PLAN FOR A DATABASE QUERY

(75) Inventors: Edward Kosciuszko, Upper Montclair; Sreekumar Menon, Parsippany, both of NJ (US); Hung-Vuong Vo, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/356,797

(22) Filed: Jul. 20, 1999

(51) Int. Cl.⁷ .................................................. G06F 17/30
(52) U.S. Cl. ................................................. 707/2; 707/102
(58) Field of Search ..................................... 707/2, 102

(56) References Cited

U.S. PATENT DOCUMENTS

| | | | | |
|---|---|---|---|---|
| 5,276,870 A | * | 1/1994 | Shan et al. ..................... | 707/2 |
| 5,301,317 A | * | 4/1994 | Lohman et al. ................. | 707/2 |
| 5,335,345 A | * | 8/1994 | Frieder et al. .................. | 707/2 |
| 5,347,653 A | | 9/1994 | Flynn et al. | |
| 5,367,675 A | * | 11/1994 | Cheng et al. ................... | 707/2 |
| 5,404,510 A | | 4/1995 | Smith et al. | |
| 5,495,605 A | * | 2/1996 | Cadot ............................. | 707/2 |
| 5,555,409 A | | 9/1996 | Leenstra, Sr. et al. | |
| 5,560,007 A | | 9/1996 | Thai | |
| 5,608,904 A | * | 3/1997 | Chaudhuri ...................... | 707/2 |
| 5,630,120 A | * | 5/1997 | Vachey ........................... | 707/2 |
| 5,666,528 A | * | 9/1997 | Thai ............................ | 707/102 |
| 5,671,403 A | * | 9/1997 | Shekita et al. ................. | 707/3 |
| 5,675,785 A | | 10/1997 | Hall et al. | |
| 5,694,591 A | * | 12/1997 | Du et al. ....................... | 707/2 |
| 5,745,904 A | | 4/1998 | King et al. | |
| 5,758,145 A | | 5/1998 | Bhargava et al. | |
| 5,765,147 A | | 6/1998 | Mattos et al. | |
| 5,765,168 A | | 6/1998 | Burrows | |
| 5,943,666 A | * | 8/1999 | Kleewein et al. ............... | 707/2 |
| 5,960,428 A | * | 9/1999 | Lindsay et al. ................. | 707/2 |
| 6,006,220 A | * | 12/1999 | Haderle et al. ................. | 707/4 |

OTHER PUBLICATIONS

Chamberlin, "Query Power: Subqueries in DB2 V2" (04/96), Database Programming & Design, pp. 45–50. Apr. 1996.
Loney, et al., "Big Tips for Big Tables" (11/96), Database Programming & Design, pp. 58–62.
O'Neil, Patrick, "The B Tree Index," Chapter 7.3, Database Principles, Programming, Performance (1994), pp. 465–479.
O'Neil, Patrick, "Support for Data Warehouses" (02/97), Database Programming & Design, pp. 39–43.
Yan, et al., "Mediator Join Indices" (04/97), IEEE Computer Society Press, Proceedings: Seventh Annual International Workshop on Research Issues in Data Engineering, pp. 51–59.
Goel, et al., "SQL Query Optinization: Reordering for a General Class of Querics," Proceedings of the 1996 ACM Sigmod International Conference on Management of Data, Montreal, Quebec, Canada, Jun. 4–6, 1996. Sigmod Record vol. 25, No. 2, Jun. 1996, pp. 47–56.

(List continued on next page.)

Primary Examiner—Frantz Coby
(74) Attorney, Agent, or Firm—Cooper & Dunham LLP

(57) ABSTRACT

A method and apparatus for viewing the effect of changes to an index for a database table on an optimization plan for a database query, such as an SQL statement. A virtual table is created which mimics the structure of an original table on the database. The virtual table is created by copying the original table, excluding any data in the original table. Any existing original indexes associated with original table are copied to define a virtual index associated with the virtual table. References in the query to the original table are replaced with references to the virtual table. The database management system then determines a new optimization plan for the query.

39 Claims, 4 Drawing Sheets

OTHER PUBLICATIONS

Simmen, et al., "Fundamental Techniques for Order Optimization," Proceedings of the 1996 ACM Sigmod International Conference on Management of Data, Montreal, Quebec, Canada, Jun. 4–6, 1996, Sigmod Record vol. 25, No. 2, Jun. 1996, pp. 57–67.

Christophides, et al., "Evaluating Queries with Generalized Path Expressions," Proceedings of the 1996 ACM Sigmod International Conference on Management of Data, Montreal, Quebec, Canada, Jun. 4–6, 1996, Sigmod Record vol. 25, No. 2, Jun. 1996, pp. 413–422.

Rao, et al., "Reusing Invariants: A New Strategy Correlated Queries," Proceedings of ACM Sigmod International Conference on Management of Data, Seattle, Washington, USA, Sigmod Record vol. 27, Issue 2, Jun. 1998, pp. 37–48.

Bhargava, et al., "Hypergraph based reorderings of outer john queries with complex predicates" Proceedings of the 1995 ACM Sigmod International Conference on Management of Data, San Jose, California, USA, Sigmod Record vol. 24, Issue 2, Jun. 1995, pp. 304–315.

Shin, et al., "A New Join Algorithm," Sigmod Record vol. 23, No. 4, Dec. 1994, pp. 13–18.

Hellerstein, et al., "Predicate Migration: Optimizing Queries with Expensive Predicates" Proceedings of the ACM Sigmod International Conference on Management of Data, Washington, DC, USA, Sigmod Record vol. 22, Issue 2, Jun. 1993, pp. 267–276.

Hellerstein, et al., "Query Execution Techniques for Caching Expensive Methods".

O'Neil, et al., "Multi–Table Joints Through Bitmapped Join Indices".

Chen, et al., "On applying hash filters to improving the execution of multi–join queries".

Hellerstein, et al., "Query Execution Techniques for Caching Expensive Methods," Sigmod '96 Jun. 1996 Montereal, Canada, pp. 423–434.

O'Neil, et al., "Multi–Table Joins Through Bitmapped Join Indices," Sigmod Record, vol. 24, No. 3, Sep. 1995, pp. 8–11.

Chen, et al., "On Applying Hash Filters To Improving The Execution of Multi–Join Queries," The VLDB Journal, Jun. 1997, pp. 121–131.

* cited by examiner

METHOD AND APPARATUS FOR VIEWING THE EFFECT OF CHANGES TO AN INDEX FOR A DATABASE TABLE ON AN OPTIMIZATION PLAN FOR A DATABASE QUERY

TECHNICAL FIELD

The present invention relates generally to viewing the effect of changes to indexing designs for database tables. More particularly, the present invention relates to using virtual tables and virtual indexes for determining optimization plans for database queries when indexes for the database tables are changed.

BACKGROUND

Achieving and maintaining simple and efficient access to computer data is a goal shared by most computer users. In addition, as the processing power of modern computers increases, greater amounts of data may need to be organized and stored for the user. One system for organizing computer data is the database, which is generally recognized as a group of logically related information objects or files stored together in some recordable medium without unnecessary redundancy. The database preferably serves various applications or programs, and facilitates access by these applications or programs.

In most databases, data is externally structured into tables. Each table generally includes a series of fields which define columns of the table. Each row of the table comprises a single record. For each row of data in a table, a counterpart of that data is physically stored in the database. Thus, when the database user requests particular information from the table, the appropriate portion of the stored data is retrieved and presented to the user.

A program referred to as a "database management system" ("DBMS") provides users with an interface to the database. The DBMS provides structure to the database that enables users to access information objects stored in the database. The DBMS identifies and retrieves certain information objects in response to information requests, or "queries" from a user. The retrieval of particular information objects depends on the similarity between the information stored in the information objects and requests presented to the system by the user. The similarity is measured by comparing values of certain attributes attached to the information objects and information requests.

For example, if a table named "Employee" contains the fields "Name", "Dept", "Age" and "Salary", and a user desires to find the subset of employees who work in the electronics department, the following query can be used:

SELECT Name, Salary, Age

FROM Employee

WHERE Dept="Electronics"

To facilitate the retrieval process, information objects in a database are often "indexed" so that the objects are characterized by assigning descriptors to identify the content of the objects. The process of characterizing these information objects, referred to as "indexing", can lead the DBMS to particular items in the database in response to specific queries from a user.

To build an index for a table, the DBMS typically scans the table, retrieves the data from every row and column in the table, and adds the data to the index, which is often in the form of a B-tree structure. For more information on B-tree structures, see Patrick O'Neil "Database—Principles, Programming, Performance," Morgan Kaufmann Publishers, Inc. (1994), incorporated herein by reference. The DBMS sequentially reads each and every data entry in the table, copies each data entry to a temporary space, sorts the data entries if necessary, and finally creates a data structure for the index.

The process of building the index for the table, however, generally consumes great amounts of time and resources. For example, creating an index for a table having several million rows may take several days. Moreover, creating the index for this table would typically require several hundred megabytes of temporary workspace to copy and sort the data before creating the index. Naturally, the process of creating or changing an index will take proportionally larger amounts of time. Tables for databases such as those used in data warehouses may have billions, or even millions of billions of rows. It may take the user weeks or even months to create the index for tables this size.

Other factors compound the time problems associated with creating the index. Specifically, after the index is created, time is required for the database to test the index and return performance statistics, and for the user to analyze those results.

With a typical indexed database system, there are generally two steps to resolving a query. The first step is to determine which clauses in the query have associated descriptors or index entries in the index, to retrieve those index entries, and preliminarily restrict the set of information objects being considered. The second step generally involves taking the set of information objects from the first step and examining each information object in turn to determine if it satisfies the query.

Structured Query Language (SQL) has evolved into a standard language for database queries or statements. An SQL interface allows users to formulate relational operations on database tables either interactively, in batch files, or embedded in host languages such as C, COBOL, etc. Operators are provided in SQL that allow the user to manipulate the data, wherein each operator operates on one or more tables and produces a new table as a result.

In the process of tuning an SQL statement or query, the user often wishes to know how a change in indexing would affect the performance of that query. As explained above, indices may be added to the database to facilitate the speed at which queries are executed, especially in larger tables where an index may make a substantial improvement in performance. On the other hand, due to the amount of data in the database, adding or changing an index may require considerable amounts of time and resources for the database to build the index. Thus, the user is often presented with the dilemma of either expending the time and resources required to build the index, at the risk of the new index not improving performance in any meaningful way, or not building the index, and risking the failure to recognize improved performance which might be possible with the index.

Oracle database management systems provide users with the ability to view an "optimization plan" of a SQL statement. An optimization plan is automatically determined by the database for the SQL statement when the statement is parsed by the database. The optimization plan shows how the database would retrieve the data necessary to satisfy the requirements of the SQL statement without actually executing the SQL statement. Specifically, the optimization plan shows, among other things, information such as what table would be first accessed, how intermediate result sets would be joined, whether an index would be used and, if so, how that index would be interpreted. Thus, by viewing the optimization plan for a particular SQL statement, the user may obtain an estimate as to how efficiently that SQL statement would be executed in the database.

In larger database management systems, the optimization of queries becomes more important to minimize the amount of time and resources consumed. Thus, it becomes equally important for users to be able to view the optimization plan for an SQL statement and ascertain the effect index changes may have on the optimization plan.

FIG. 1 is a flow diagram of a conventional method 100 for viewing the effect of changes to an index for a database table on an optimization plan for an SQL statement. In step 110, an original optimization plan is created for the SQL statement. In step 120, the indices for a table referenced in the SQL statement are created, dropped or modified. In step 130, a new optimization plan is created for the SQL statement. Lastly, in step 140, the user compares the new optimization plan with the original optimization plan to determine if performance would be improved or worsened as a result of the index changes.

As explained above, however, conventional method 100 of FIG. 1 requires excessive time and resources to create, drop or change the index. Moreover, excessive time and resources are then required for the database to gather the necessary statistics to build the various optimization plans. If the database is not used in a production environment, taking the time to make changes to the index using conventional methods might be possible. If the database is used in production, however, it would most likely not be feasible to expend the time and energy needed make the changes shown in FIG. 1 due to the tremendous negative impact on speed, resources and overall performance. For example, using the methodology of FIG. 1, if a tool or application were relying upon an existing index, and the user changed or dropped that index in step 120, the database could shut down and the entire system could deadlock.

Thus, with conventional methods for previewing the effect of index changes on optimization plans, the user is often compelled to minimize any experimentation with the index. This, in turn, often results in the failure to realize the optimal index topography or optimization plan for the database which could cost great amounts of time and energy when the SQL statements are executed in the database, particularly for larger database management systems. Thus, there is a need for a faster and more efficient way to change indexing designs for database tables and to create optimization plans for these indexes.

SUMMARY

The present invention allows a user to see how an optimization plan for a database query changes when a new index is added to a database table, an existing index is dropped from the table, or an existing index for the table is modified.

A method and apparatus provide a framework for a user to experiment with the index topography for tables and preview the effects that the various topographical constructions of indexes can have on the optimization plan for a database query, such as an SQL statement, without having to dedicate the time and resources required by conventional methods.

According to aspects of the present invention, a virtual table is created which mimics the structure of a table on the database under test, or "original table" on the database. The virtual table is generally created by copying the original table, excluding any data in the original table. Thus, for example, if the data is stored in rows of the original table, the rows are not copied into the virtual table. Any existing indexes associated with original table, or "original indexes," however, are copied to define a virtual index associated with the virtual table.

By excluding data when copying the original table to define the virtual table, the associated virtual index may be easily and quickly modified while preserving the overall structure of the original table. New indices may be added and existing indices may be dropped very quickly. Also, if no original index exists, a new virtual index may be easily created.

In the query, references to the original table are replaced with references to the virtual table. The database management system then determines a new optimization plan for the query. Because the new optimization plan is determined using the virtual table and virtual index, the plan is retrieved much faster than if it were created using the original table and any associated original index. This is because the actual data in the original table was excluded when the original table was copied to define the virtual table. Thus, any changes to the optimization plan may be identified quickly after the indexing design is altered.

Before the new optimization plan is displayed for the user, any references in the new optimization plan to the virtual table and any virtual index are replaced with the names of the original table and the original index. In this way, the user can compare the new optimization plan with the original optimization plan and analyze the changes without concerning himself with, or even needing to know about, the use of virtual objects in creating the new optimization plan.

DETAILED DESCRIPTION

Figure 1:
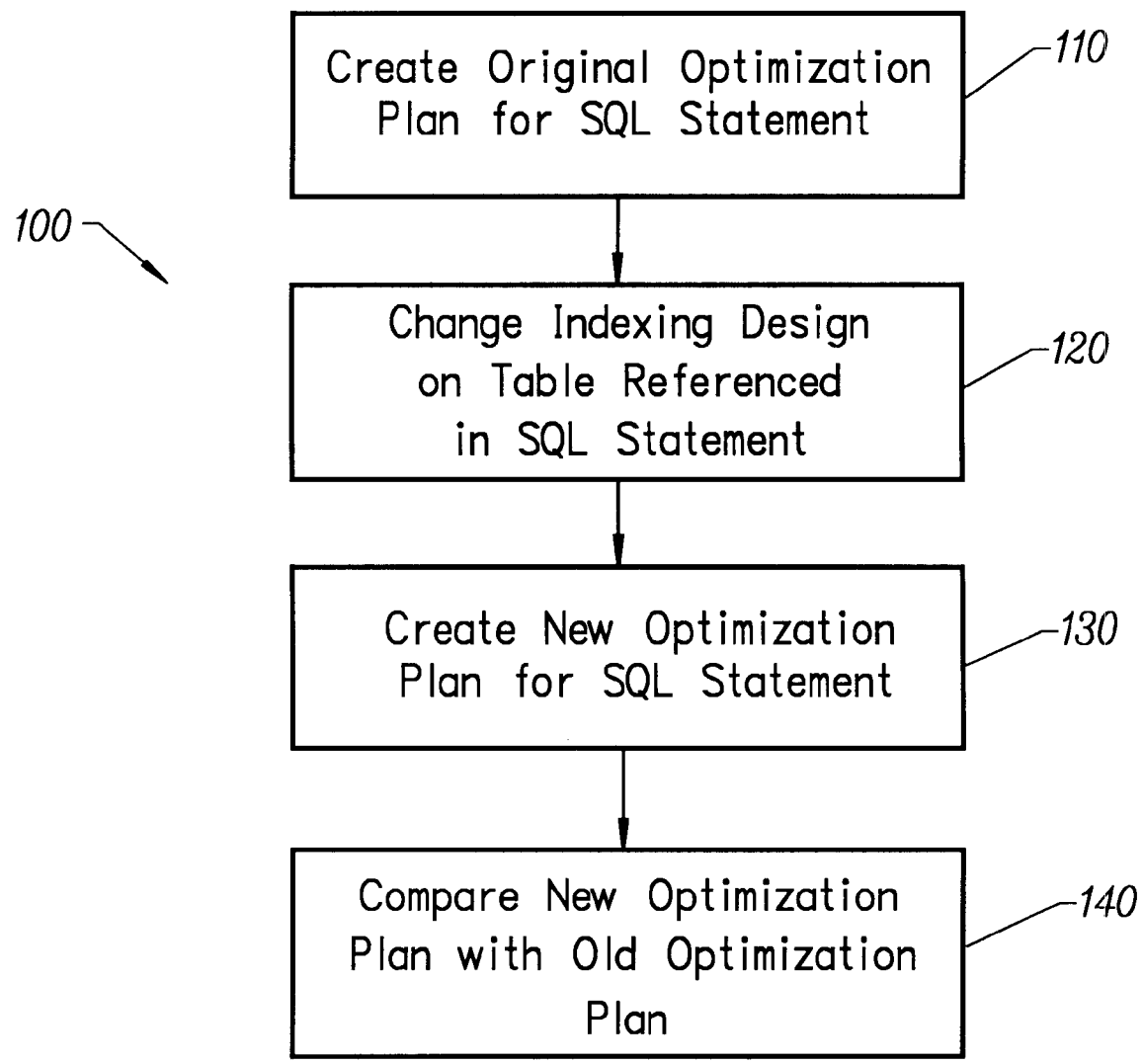
FIG. 1 is a flow diagram of a conventional method 100 for viewing the effect of changes to an index for a database table on an optimization plan for a SQL statement.
Figure 2:
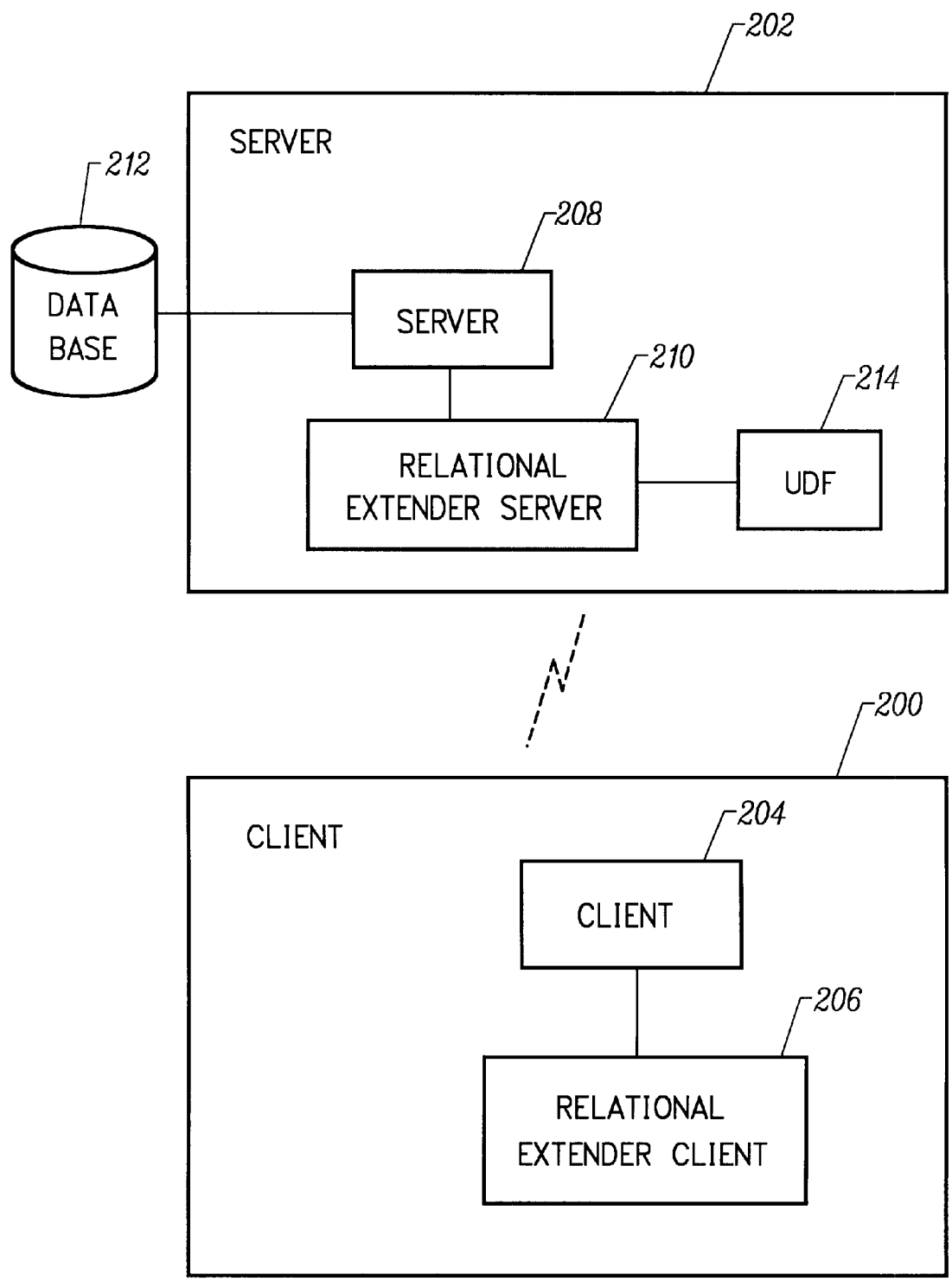
FIG. 2 is a block diagram illustrating an exemplary hardware environment in which exemplary embodiments of the present invention may be implemented.

FIG. 2 is a block diagram illustrating an exemplary hardware environment in which exemplary embodiments of the present invention may be implemented. In the hardware environment of FIG. 2, a client computer 200 is coupled to a server computer 202. Both the client computer 200 and server computer 202 may include, inter alia, processors, random access memory (RAM), read-only memory (ROM), keyboard, display, fixed and/or removable data storage devices, and data communications devices.

In FIG. 2, server computer 202 is in communication with a database 212 which is preferably an Oracle database. As should be appreciated by those skilled in the art, other databases may be used such as Microsoft SQL Server databases, Sybase SQL Server databases, and IBM DB2 databases.

Those skilled in the art will recognize that any combination of the above components described with reference to FIG. 2, or any number of different components, peripherals, and other devices, may be used with the client computer 200 and server computer 202. Those skilled in the art will also recognize that exemplary embodiments of the present invention may be implemented on a single computer rather than multiple computers networked together.

Exemplary embodiments of the present invention are typically implemented using database management system software, such as the SQL-Station software made and sold by PLATINUM Technology, although it may be implemented with any database management system software such as the Developer/2000 package sold by Oracle or the DB2 product sold by IBM. Moreover, PLATINUM's SQL-Station software, in which exemplary embodiments of the present invention may be realized, may be used in conjunction with other software such as Oracle Developer/2000 software and the DB2 product sold by IBM.

In FIG. 2, the software includes an SQL-Station client program 204 and Relational Extender client program 206 executed by the client computer 200. The software further includes an Oracle server program 208 and Relational Extender program 210 executed by the server computer 202. These programs execute under the control of an operating system on their respective computers 200 or 202, such as WINDOWS 95, WINDOWS NT, OS/2, AIX, MVS, UNIX, etc. Those skilled in the art will recognize that any combination of the above programs, or any number of different programs, may be used to implement exemplary embodiments of the present invention.

The SQL-Station client program 204 and the Relational Extender client program 206 generate commands for performing various search and retrieval functions, i.e., queries, against the database 212 managed by the Oracle server program 208 and the Relational Extender server program 210. In the preferred embodiment, these queries conform to the SQL standard, although other types of queries could also be used without departing from the scope of the invention. The queries invoke functions performed by the Oracle server program 208 and the Relational Extender server program 210, such as definition, access control, interpretation, compilation, database retrieval, and update of user and system data.

Generally, DBMS software, the SQL queries, and the instructions derived therefrom, are all tangibly embodied in or readable from a computer-readable medium, e.g. one or more data storage devices and/or data communications devices. Moreover, the RDBMS software, the SQL queries, and the instructions derived therefrom, are all comprised of instructions which, when read and executed by the client computer 200 and/or the server computer 202, causes the client computer 200 and/or the server computer 202 to perform the steps necessary to implement and/or use embodiments of the present invention.

Figure 3:
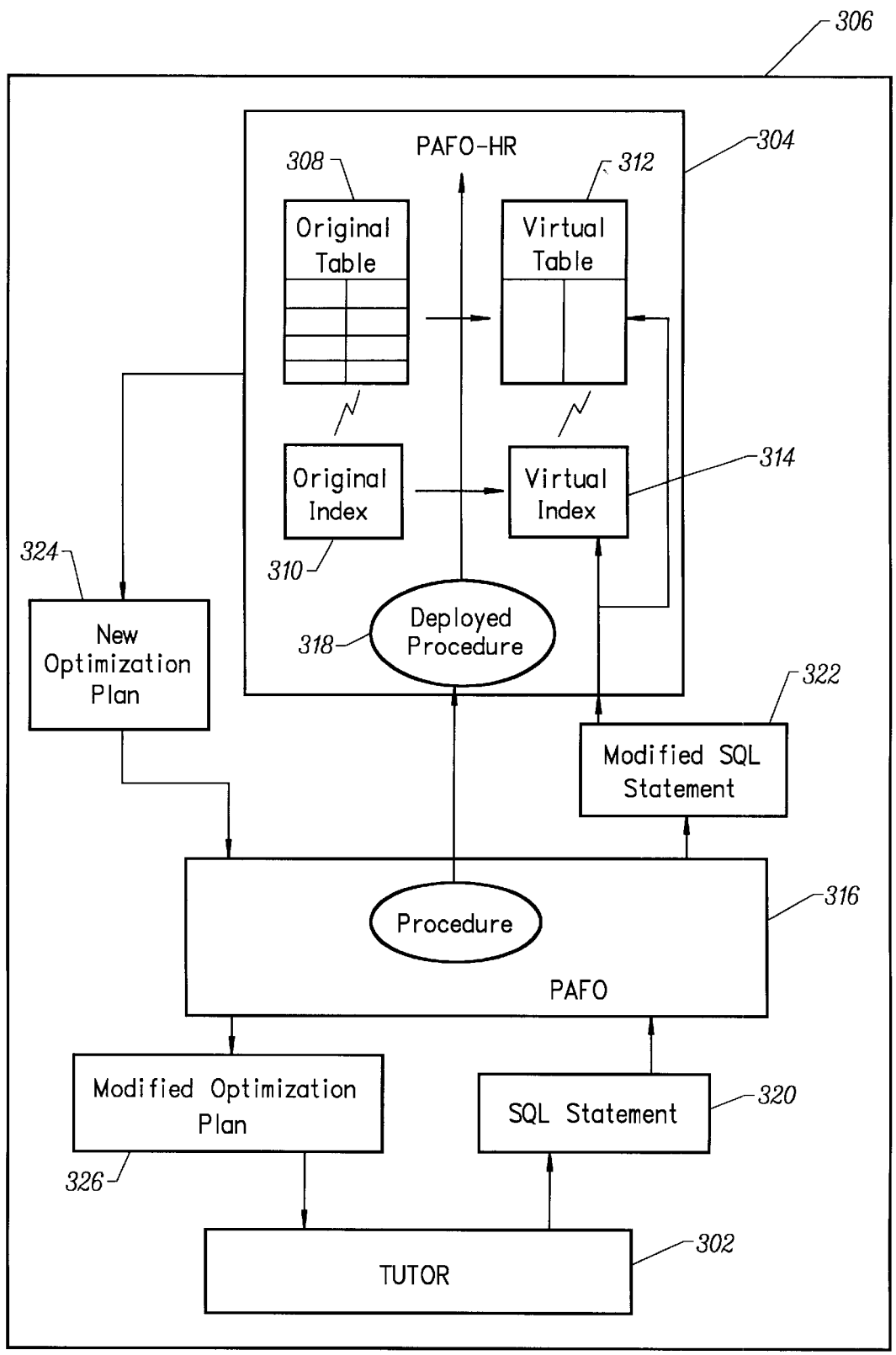
FIG. 3 is a block diagram illustrating a system for viewing the effect of changes to an index for a database table on an optimization plan for a database query, according to an exemplary embodiment of the present invention.

FIG. 3 is a block diagram illustrating a system for determining the effect of changes to an index for a database table on an optimization plan for a database query, according to an exemplary embodiment of the present invention. There are two users or "schemas" shown, namely "TUTOR" 302 and "PAFO-HR" 304, each of which have access to a database 306, which is preferably an Oracle database such as the Oracle 8 database.

In FIG. 3, each user 302, 304 controls its own objects and information stored in tables within that user's account. For example, user PAFO-HR 304 controls original table 308 and an associated index 310, as well as virtual table 312 and a virtual index 314 associated with virtual table 312. The tables 308, 312 and the respective associated indexes 310, 314 are stored on the database.

Each user 302, 304 generally controls information stored in that user's account to the exclusion of other users of database 306. Users may, however, be granted various privileges with respect to the accounts of other users. Generally, the privilege may only be granted from one user to another with respect to the one user's account. For example, in FIG. 3, only PAFO-HR 304 has the power to grant privileges on the PAFO-HR 304 account to other users.

One such privilege is "READ," that is, the permission to access information in another user's account. For example, in FIG. 3, user PAFO-HR 304 has given user TUTOR 302 permission, or granted TUTOR 302 a READ privilege, to access information and objects stored in tables in the PAFO-HR 304 account. Thus, TUTOR 302 is able to query the tables in PAFO-HR's account and access such information in the PAFO-HR 304 account. On the other hand, a third user "SCOTT" (not shown) has not been granted such READ privileges with respect to PAFO-HR's account, so SCOTT cannot access tables controlled by PAFO-HR 304.

Another such privilege available in the system of FIG. 3 is a "CREATE_TABLE" privilege or set of privileges, which may also be granted from one user to another. The CREATE_TABLE privilege, if granted by the one user, allow other users to create tables in the one user's account, and to store objects in those tables.

Users often do not wish to grant CREATE_TABLE privileges to other users on a database system, because of the broad power it gives other users to unilaterally choose to modify or delete information stored within another user's account. Thus, in the database environment of FIG. 3, TUTOR 302 has not been granted CREATE_TABLE privileges with respect to PAFO-HR's account.

In FIG. 3, in accordance with exemplary embodiments of the present invention, a software package entitled "Plan Analyzer for Oracle" ("PAFO") 316 is stored on database 306. This software package is accessible by users 302, 304 of the database system. Unlike TUTOR 302, the package PAFO 316 has CREATE_TABLE privileges with respect to PAFO-HR 304 granted to PAFO 316 along with several other privileges by the Database Administrator (DBA). Thus, a user logged into the TUTOR 302 account who would otherwise not have privileges required to access and experiment with the tables and indices in the PAFO-HR 304 account, may use the PAFO package 316 to accomplish these tasks.

In FIG. 3, TUTOR 302 calls the package PAFO 316 to execute methods of the present invention. When PAFO 316 is called, PAFO 316 creates and dynamically deploys a procedure 318 to the PAFO-HR 304 account. The deployed procedure 318 is then executed in the PAFO-HR 304 account. Deployed procedure 318 may then grant the necessary privileges for accessing the PAFO-HR 304 account to the user of the TUTOR 302 account. The deployed procedure then grants READ (not write) privileges on the virtual table to TUTOR, the user's account. In this way, TUTOR can access both original table 308 and virtual table 312 without having the CREATE_TABLE privilege. The functionality of deployed procedure 318 is hereafter described with reference to FIGS. 3 and 4.

Figure 4:
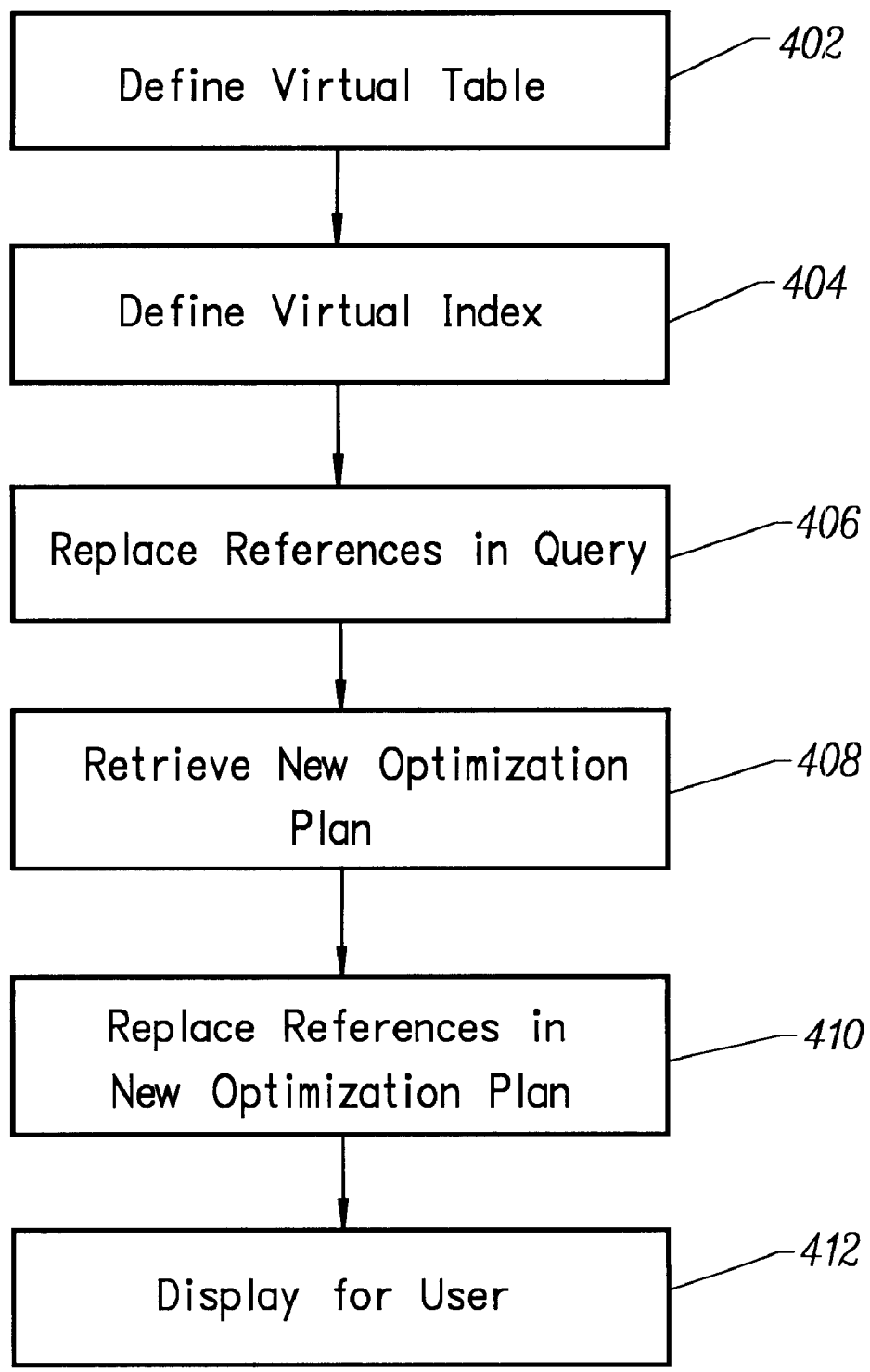
FIG. 4 is a flow diagram of a method for viewing the effect of changes to an index for a database table on an optimization plan for a database query, in accordance with an exemplary embodiment of the present invention.

In step 402 of FIG. 4, procedure 316 identifies original table 308, as referenced in SQL statement 320, and copies original table 308 to define virtual table 312. This copying, in step 402, includes copying the original table statistics to the new table, including the column statistics, histograms, and segment storage. In this way, it appears as if the virtual table contains as many rows of data as the original table. Any actual data in original table 308, however, is preferably excluded from the information copied to define virtual table 312. Thus, for example, when data is stored in rows of original table 308, the rows are not copied into the virtual table 312.

In step 402, the benefits of creating and working with a copy of the original table are many. Users accessing original table 308 are not disrupted and performance is not degraded by the changes. In a production environment, executing applications are not affected. When Oracle databases are used, nothing in the Oracle catalog needs to be modified for original table 308. Moreover, since the virtual table does not contain any rows, index creation is very fast.

In step 402, if other original tables are present in the PAFO-HR 304 account, these tables may also copied to define corresponding virtual tables. Also, for reasons which will become apparent below, a list (not shown) is preferably maintained in which the names of virtual tables are correlated with the original tables from which they were created.

In step 404, virtual index 314, to be associated with virtual table 312, is defined. In this step, if any original index 310 exists, associated with original table 308, procedure 316 makes copies of original index 310 to define virtual index 314. For example, if original indices are defined for the two columns shown in original table 308 of FIG. 3, corresponding virtual indices are created for the two columns shown in virtual table 312 by copying the original indices.

The statistics associated with original index 310 are also copied into virtual index 314, and may then be set as specified by the user. In this way, the virtual indices preferably have the same data structures as the original indices, including the same constraints and definitions. Thus, as far as any optimization plan is concerned, the structure of the virtual index is the same as the original index.

In step 404, if no original index 310 associated with original table 308 exists, virtual index 314 may be created and defined by the user through procedure 316. Also, in situations where a user wishes to experiment with no index, the user may simply choose to define virtual index 314 by deleting any indices present in original index 310, using deployed procedure 316. At this point, procedure 318 is created on PAFO-HR 304 and executed to grant READ privileges to Tutor 302.

In step 406, after virtual index 314 is defined, PAFO 316 replaces in SQL statement 320 any reference to original table 308 with a reference to virtual table 312. In addition, any reference to original index 310 in SQL statement 320 is switched with the name of virtual index 314.

A modified SQL statement 322 with the replaced names is then sent to the database server. A user of account TUTOR 302 will believe he is accessing original table 308, while actually accessing virtual table 314. Moreover, by creating a copy of the original table and simply changing the name of that object as it is referenced in the SQL statement, the need for the time-consuming and resource-consuming process of creating a new index on the original table is eliminated.

Because the PAFO program 316 has altered SQL statement 320 to define modified SQL statement 322, the database interprets the modified SQL statement 322 to determine the new optimization plan 324 for the virtual table in step 408.

In step 410, information in new optimization plan 324 returned by the database server is then modified by PAFO procedure 316 to define a modified optimization plan 326. Specifically, any references in new optimization plan 324 to virtual index 314 and virtual table 312 are replaced, respectively, with references to original index 310 and original table 308.

The modified optimization plan 326, with the replaced names, is then displayed to the user in step 412. Thus, to the user, it appears as though he is working only with the original objects 308 and 310. Using the methodology described above, the time required to make the changes to the index and retrieve the new optimization plan is often reduced from a matter of hours to a matter of seconds. Thus, the user simply enjoys improved speed and system performance in retrieving the new optimization plan without needing to concern himself with, or even be aware of, the use of virtual tables and virtual indexes.

The user may then compare modified optimization plan 326 with any original optimization plan created for original table 308 and original index 310. If the new optimization plan is more desirable, e.g., appears as if it would improve the speed and efficiency of the database in executing SQL statement 320, the user may then choose to actually build virtual index 314 on original table 308. Conversely, if performance would not be improved, the user may experiment with a different virtual index 314 or continue using original index 310 without having wasted the time and resources which would have otherwise been required to construct virtual index 314.

Each of the functions described above, with respect to FIGS. 3 and 4, can be performed simultaneously by multiple users on the same object. These functions do not interfere with other users of the objects, nor do they have a significant impact on performance, allowing them to be performed on a production system.

EXAMPLE

In one example, a user is logged onto the TUTOR 302 account of FIG. 3. In this example, original table 308 in account PAFO-HR 304 is a table storing the name of employees of a company or firm and, as such, is referred to hereafter as the "EMPLOYEES" table. TUTOR 302 has been granted READ privileges with respect to PAFO-HR's account, so TUTOR 302 is able to send queries to the EMPLOYEES table.

Virtual table 312 has been created for the EMPLOYEES table where the virtual table name is "T_########1." Original SQL statement 320 is the following:

SELECT*

FROM hr.employees e

WHERE hiredate>:H_Date

The following SQL statement is sent to the server as modified SQL statement 322, with the original table name "EMPLOYEES" replaced with the virtual table name "T_########1: "

SELECT*

FROM hr. T_########1 e

WHERE hiredate>:H_Date

If SQL statement 320 contains optimization hints, PAFO 316 check for hints containing original table name "EMPLOYEES" or one of the indexes associated therewith as parameters to the hints. For instance, assume the user is working with the following SQL statement 320:

SELECT/*+INDEX (e, I_EMP_HIREDATE)*/*

FROM EMPLOYEES e

WHERE hiredate>:H_Date

When the user requests to view the optimization plan for SQL statement 320, the following message is sent to the database server as modified SQL statement 322:

SELECT/*+INDEX (e, I_#########5)*/*
FROM hr.T_#########1 e
WHERE hiredate>:H_Date In the interest of avoiding corruption in the system, each user is preferably only allowed to create a single copy of the EMPLOYEES table to define "T_#########1," the virtual table. Each user is preferably restricted from creating a new copy if a copy is already created for that user.

With the procedures described below, the name of the original table is preferably specified rather than the virtual table name. So, for example, if the user creates a first virtual index on the EMPLOYEES table, the user can create a second virtual index or drop an index on the virtual copy of the EMPLOYEES table, but the table name parameter should be the name of the original table. In the latter case, where the user reuses a virtual table created before, the PAFO package ensures that the index names retrieved still exist on the original table. For example, the following SQL query may be used:

SELECT index_name FROM expl_indexes
WHERE owner=:Index_Owner
AND index_name=:Index_Name
AND table_name=:Table_Name Finally, since only the names of indexes that existed on the original table are generally returned, the virtual indexes created should be queried with a statement such as the following:

SELECT owner, index_name FROM expl_indexes
WHERE table_owner=:Virtual_Table_Owner
AND table_name=:Virtual_Table_Name
AND (owner, index_name) NOT IN
  (('owner1','index1'), ('owner2','index2'), . . . ), where the ('owner1','index1') pairs are the owner and name of the indexes returned.

In this example, the following steps are used for viewing the effect of changes to an index for a database table on an optimization plan for a database query.

Step 1: Create Virtual Table

The following procedure may be executed to create the virtual table, assuming a virtual table has not already been created:

begin
    pafo.explain_virtual.create_virtual_table (:table_owner, :table_name); end;

If the virtual table already exists, an error condition will be returned. The parameters are defined as follows:

TABLE 1

| Bind Variable | Mode | Datatype | Description |
| --- | --- | --- | --- |
| table_owner | Input | VARCHAR2(30) | Name of the owner of the original table. This is for whom the virtual table will be created. |
| table_name | Input | VARCHAR2(30) | Name of the original table. |

In Table 1, VARCHAR2 (30) represents a character string of up to 30 characters. Further, MODE=INPUT indicates data being input to the procedure. Conversely, as used in tables below, MODE=OUTPUT represents data being retrieved from the procedure.

Step 2: Define Virtual Table and Index Names

After creating the virtual table, the following procedure may be executed to return the name of the virtual table and the names of the indexes that were copied to define virtual indexes.

begin
    pafo.explain_virtual.get_virtual_table_aliases (:table_owner, :table_name, :virtual_table_name, :virtual_index_count, :original_index_owners, :original—index—names, :virtual—index—names); end;

TABLE 2

| Bind Variable | Mode | Datatype | Description |
| --- | --- | --- | --- |
| table_owner | Input | VARCHAR2(30) | Owner of original table |
| table_name | Input | VARCHAR2(30) | Name of original table |
| virtual_table_name | Output | VARCHAR2(30) | Name used to create the virtual table. |
| virtual_index_count | Output | INTEGER | Number of indexes that existed on the original table. Each of these indexes was recreated on the virtual table but with a different name. |
| original_index_owners | Output | Array of VARCHAR2(30) | Array of index owners. These names are the same for the original and virtual indexes. (Array size =: virtual index count) |
| original_index_names | Output | Array of VARCHAR2(30) | Array of index names. These are the names used on the original table. (Array size =: virtual index count) |
| virtual_index_names | Output | Array of VARCHAR2(30) | Array of index names. These are the names used to create the copies of the indexes listed in "original_index_names". There is preferably a 1-1 correspondence between the names in the "original_index_names" and "virtual_index_names" arrays. (Array size =: virtual index count) |

The call of step 2 generally assumes the virtual table was created using the CREATE_VIRTUAL_TABLE procedure. This means that if the virtual table exists in a cluster, that cluster is the same cluster in which the original table exists. That is, the virtual table is not the product of a request to make an unclustered table clustered. Otherwise an error is returned.

Step 3: Default Statistics

The new virtual index preferably has realistic statistics in order to ensure that an optimization plan is created that is equivalent to having the index created on the original table. EXPLAIN_VIRTUAL provides the procedure DEFAULT_NEW_INDEX_STATS to assist the user in setting the appropriate statistics.

If the original table has existing indexes, the storage information and statistics of those indexes will be used to generate default storage information and statistics for the virtual index. If the existing indexes are not analyzed, limited default will be available.

After executing DEFAULT_NEW_INDEX_STATS, the default storage information and statistics are returned to PAFO for display and modification. The user is permitted to change these statistics to better identify the index properties. To help the user decide how to change the statistics, PAFO allows the user to display the statistics on other indexes currently created on the table.

The following procedure may be executed to obtain the default statistics:
begin
   pafo.explain_virtual.default_new_index_stats (:table_owner, :table_name, :ind_name, :ind_col_names, :num_ind_columns, :default_tablespace, :init_trans, :max_trans, :pct_free, :btree_levels, :leaf_blocks, :avg_leaf_blocks, :avg_data_blocks, :cluster_factor, :blocks_allocated, :extents_allocated, :distinct—values); end;

The parameter definitions are as follows:

TABLE 3

| Parameter | Mode | Datatype | Usage |
| --- | --- | --- | --- |
| table_owner | Input | VARCHAR2(30) | ORACLE account owning the table on which the index will be created. |
| table_name | Input | VARCHAR2(30) | Table name. |
| ind_name | Input | VARCHAR2(30) | Name of proposed index to create. |
| ind_col_names *1 | Input | Array of VARCHAR2(30) | Columns the index will be created for. The order of the columns in the array should match the order requested by the user. |
| num_ind_columns | Input | NUMBER | Number of columns; that is, the number of elements in the array, IND_COL_NAMES. |
| default_tablespace | Output | VARCHAR2(30) | Tablespace name on which the index will be created. |
| init_trans | Output | NUMBER | INIT_TRANS parameter for creating the index. |
| max_trans | Output | NUMBER | MAX_RANS parameter for creating index. |
| pct_free | Output | NUMBER | PCT_FREE parameter for creating index. |
| btree_levels | Output | NUMBER | Statistic that will be stored with the index. |
| leaf_blocks | Output | NUMBER | " |
| avg_leaf_blocks | Output | NUMBER | " |
| avg_data_blocks | Output | NUMBER | " |
| cluster_factor | Output | NUMBER | " |
| blocks_allocated | Output | NUMBER | " |
| extents_allocated | Output | NUMBER | " |
| distinct_values | Output | NUMBER | " | bind parameter the array of actual lengths of each element.

The following error codes may be generated when executing the procedure DEFAULT_NEW_INDEX_STATS. The second column contains a description of error and how, if possible, the user can resolve the error in parenthesis.

TABLE 4

| -20001 | User is neither table owner; nor INDEX privilege on table; nor CREATE ANY INDEX privilege. (proper privileges should be obtained.) |
| --- | --- |
| -20002 | Table does not exist. (Check the table name and owner.) |
| -20003 | Index already exists with specified columns. (The table already has an index with the requested columns.) |
| -20004 | Column_____ not found. (The index column does not exist.) |
| -20005 | Invalid table owner. (The Oracle account entered for the table owner does not exist.) |
| -20006 | Index name is not unique. (Enter a. different index name for the virtual index.) |
| -20010 | First perform CLEAN_UP on the table. (The table already has a virtual index created by the user. |

The output parameters will be input to the next procedure executed, EXPLAIN_VIRTUAL. CREATE_VIRTUAL_INDEX. Also, note that it is possible the user will attempt to create the index on a tablespace to which the user does not have access.

Step 4: Create Virtual Index

Any existing indexes of the original table are preferably copied to define the virtual index. The index statistics and storage information are also copied. To this end, the following procedure may be executed:
begin
   pafo.explain_virtual.create_virtual_index (:table_owner, :table_name, :ind_name, :ind_col_names, :num_ind_columns, :default_tablespace, :init_trans, :max_trans, :pct_free, :btree_levels, :leaf_blocks, :avg_leaf_blocks, :avg_data_blocks, :cluster_factor, :blocks_allocated, :extents_allocated, :distinct_values); end;

The parameters are defined above in step 3.

Step 5: Final Step

At this point, PAFO creates a new WHAT IF frame as described above displaying the original SQL text. The user is allowed to modify the text and add hints. The "tag" from the SQL frame is copied and the same sequential number is used. For instance, if the SQL Frame label is SQL: HISTORY;1, then the WHAT IF Frame should be labeled, WHAT IF: HISTORY;1.

When the user requests an optimization plan, PAFO should alter the SQL text that is explained, BUT not on the SQL frame. Nonetheless, the SQL should look like the original SQL statement. Thus, the procedure desirably makes a copy of the SQL text and replace all occurrences of the original table name (:table_name) with the table copy's name (:temp_table_name).

If the SQL statement uses a synonym (local or public) to point to the original table, the modified SQL text should include both the owner of the virtual table, and the virtual table name. Hint parameters may also need to be changed if the hints reference the table or an index on the table. The plan is then created and retrieved into memory.

For each OBJECT_OWNER and OBJECT_NAME combination, where the OPERATION column starts with 'TABLE', the temporary table name should be changed to the original name (:table_name).

For each of the virtual indexes returned in step 2 above, the optimization plan should be searched for these virtual index names and replaced with the original index name. The virtual indexes are identified in the arrays (:original_index_owners, :original_index_names). The associated replacement index names are stored in the array (:virtual_index_names). So PAFO searches each step where the OPERATION column starts with the text "INDEX". If the OBJECT_OWNER and OBJECT_NAME match the ORIGINAL_INDEX_OWNER(0) and VIRTUAL_INDEX_NAME (0) values, the index name should be changed to ORIGINAL_INDEX_NAME(0). This is preferably repeated for each of the array elements.

The modified plan is then displayed, and the user is informed if the virtual index created had an effect on performance.

When displaying the information in the "OBJECT" tab, PAFO preferably makes the same changes as described above in steps 4 & 5; that is, PAFO displays the indexes for T_########1, not EMPLOYEES. But PAFO should use the name EMPLOYEES instead of T1 when displaying the information to the user. Also, when displaying the indexes, the associated ORIGINAL_INDEX_NAME values should be displayed.

When the user clicks on a step of the plan that contains either the virtual table name or one of it's indexes, the statistics for the associated virtual index should be displayed. Thus, the user clicks on EMPLOYEES, the user sees the name EMPLOYEES, but PAFO lists the statistics for T_########1. The same holds true for the indexes on EMPLOYEES.

Dropping a Virtual Index

The only indexes that can be dropped by this procedure are preferably those belonging to a virtual table. So if a virtual table does not exist, it should be created. The virtual table is created via the procedure CREATE_VIRTUAL_TABLE. Then the user may indicate from which table he wishes to drop an index. The following steps may then be used:

Step 1. List All Tables to which the User has Access
  SELECT owner, table_name
  FROM expl_tables
Step 2. Determine if the Selected Table is Virtual
  SELECT table_id, new_table_name
  FROM my_explain_virtual_tables
  WHERE orig_table_name=:Table name
  If the query returns a row, then the virtual copy exists. Otherwise, create the virtual table (see step 1 in Creating Virtual Index above).
Step 3. List Virtual Indexes on Virtual Table
  List the virtual indexes on the virtual table (see step 2 in Creating Virtual Index above).
Step 4. Drop the Virtual Index
  To drop one of the virtual indexes, perform the following procedure:
  begin
    pafo.explain_virtual.drop_virtual_index (:table_owner, :table_name, :virtual_index_name) end;

TABLE 5

| Parameter | Mode | Datatype | Usage |
| --- | --- | --- | --- |
| table_owner | Input | VARCHAR2(30) | ORACLE account owning the original table. |

TABLE 5-continued

| Parameter | Mode | Datatype | Usage |
| --- | --- | --- | --- |
| table_name | Input | VARCHAR2(30) | Name of the original table. |
| index_name | Input | VARCHAR2(30) | Name of the virtual index; (EXPLAIN_VIRTUAL_INDEXES.NEW_INDEX_NAME) |

Cleaning Up

To drop a specific virtual table and clean up the associated information in the PAFO repository, the following procedure may be executed:
begin
  pafo.explain_virtual.clean_up_table (:virtual_table_creator, :original_table_owner, :original_table_name); end;

TABLE 6

| Parameter | Mode | Datatype | Usage |
| --- | --- | --- | --- |
| virtual_table_owner | Input | VARCHAR2(30) | ORACLE account that created the virtual table. |
| original_table_owner | Input | VARCHAR2(30) | ORACLE account that owns the original table. |
| original_table_name | Input | VARCHAR2(30) | Name of the original table. |

To drop all virtual tables, execute the following:
begin
  pafo.explain_virtual.clean_up_all; end;

It should be understood that the particular embodiments described above are only illustrative of the principles of the present invention, and various modifications could be made by those skilled in the art without departing from the scope and spirit of the invention. Thus, the scope of the present invention is limited only to the extent of the claims that follow.

What is claimed is:

1. In a database management system including an original table having structural information and data stored in a database, a method for determining changes to an original optimization plan for a query to the database, the query including a reference to the original table, the method comprising:
  copying the original table, including the structural information but excluding the data, to define a virtual table;
  replacing, in the query, the reference to the original table with a reference to the virtual table; and
  determining a new optimization plan for the query.

2. The method of claim 1 wherein the structural information of the original table includes statistical information.

3. The method of claim 2 wherein the statistical information includes a number of rows of the original table.

4. The method of claim 1 further comprising comparing the new optimization plan with the original optimization plan.

5. The method of claim 1 further comprising, before comparing the new optimization plan and the original optimization plan:
  replacing, in the new optimization plan, a reference to the virtual table with the reference to the original table.

6. The method of claim 5 further comprising, before comparing the new optimization plan and the original optimization plan:

displaying the new optimization plan with the reference to the original table.

7. In a database management system including an original table having structural information and data stored in a database, a method for determining changes to an original optimization plan for a query to the database, the query including a reference to the original table, the method comprising:

copying the original table, including the structural information but excluding the data, to define a virtual table;

defining a virtual index associated with the virtual table;

replacing, in the query, the reference to the original table with a reference to the virtual table;

adding, to the query, a reference to the virtual index; and determining a new optimization plan for the query.

8. The method of claim 7 wherein defining the virtual index includes copying an original index associated with the original table.

9. The method of claim 8 wherein defining the virtual index further includes changing the original index.

10. The method of claim 8 wherein copying the original index includes copying statistical information associated with the original index.

11. The method of claim 7 further comprising comparing the new optimization plan with the original optimization plan.

12. The method of claim 7 further comprising, before comparing the new optimization plan and the original optimization plan:

replacing, in the new optimization plan, a reference to the virtual table with the reference to the original table.

13. The method of claim 12 further comprising, before comparing the new optimization plan and the original optimization plan:

displaying the new optimization plan with the reference to the original table.

14. A processor readable storage medium having processor readable code embodied on the processor readable storage medium, the processor readable code for programming a processor to perform a method for determining changes to an original optimization plan for a query to a database, the query including a reference to an original table having structural information and data stored in a database, the method comprising:

copying the original table, including the structural information but excluding the data, to define a virtual table;

replacing, in the query, the reference to the original table with a reference to the virtual table; and determining a new optimization plan for the query.

15. The processor readable storage medium of claim 14, wherein the structural information of the original table includes statistical information.

16. The processor readable storage medium of claim 15 wherein the statistical information includes a number of rows of the original table.

17. The processor readable storage medium of claim 14, the method further comprising comparing the new optimization plan with the original optimization plan.

18. The processor readable storage medium of claim 14, the method further comprising, before comparing the new optimization plan and the original optimization plan:

replacing, in the new optimization plan, a reference to the virtual table with the reference to the original table.

19. The processor readable storage medium of claim 18, the method further comprising, before comparing the new optimization plan and the original optimization plan:

displaying the new optimization plan with the reference to the original table.

20. A processor readable storage medium having processor readable code embodied on the processor readable storage medium, the processor readable code for programming a processor to perform a method for determining changes to an original optimization plan for a query to a database, the query including a reference to an original table having structural information and data stored in a database, the method comprising:

copying the original table, including the structural information but excluding the data, to define a virtual table;

defining a virtual index associated with the virtual table;

replacing, in the query, the reference to the original table with a reference to the virtual table;

adding, to the query, a reference to the virtual index; and determining a new optimization plan for the query.

21. The processor readable storage medium of claim 20, wherein defining the virtual index includes copying an original index associated with the original table.

22. The processor readable storage medium of claim 21, wherein defining the virtual index further includes changing the original index.

23. The processor readable storage medium of claim 21, wherein copying the original index includes copying statistical information associated with the original index.

24. The processor readable storage medium of claim 20, the method further comprising comparing the new optimization plan with the original optimization plan.

25. The processor readable storage medium of claim 20, the method further comprising, before comparing the new optimization plan and the original optimization plan:

replacing, in the new optimization plan, a reference to the virtual table with the reference to the original table.

26. The processor readable storage medium of claim 25, the method further comprising, before comparing the new optimization plan and the original optimization plan:

displaying the new optimization plan with the reference to the original table.

27. In a database management system including an original table having structural information and data stored in a database, an apparatus for determining changes to an original optimization plan for a query to the database, the query including a reference to the original table, the apparatus comprising:

means for copying the original table, including the structural information but excluding the data, to define a virtual table;

means for replacing, in the query, the reference to the original table with a reference to the virtual table; and means for determining a new optimization plan for the query.

28. The apparatus of claim 27 wherein the structural information of the original table includes statistical information.

29. The apparatus of claim 28 wherein the statistical information includes a number of rows of the original table.

30. The apparatus of claim 27 further comprising:

means for comparing the new optimization plan with the original optimization plan.

31. The apparatus of claim 27 further comprising:

means for replacing, in the new optimization plan, a reference to the virtual table with the reference to the original table.

32. The apparatus of claim 31 further comprising:

means for displaying the new optimization plan with the reference to the original table.

33. In a database management system including an original table having structural information and data stored in a database, an apparatus for determining changes to an original optimization plan for a query to the database, the query including a reference to the original table, the apparatus comprising:

means for copying the original table, including the structural information but excluding the data, to define a virtual table;

means for defining a virtual index associated with the virtual table;

means for replacing, in the query, the reference to the original table with a reference to the virtual table;

means for adding, to the query, a reference to the virtual index; and means for determining a new optimization plan for the query.

34. The apparatus of claim 33 wherein the means for defining the virtual index includes means for copying an original index associated with the original table.

35. The apparatus of claim 34 wherein the means for defining the virtual index further includes means for changing the original index.

36. The apparatus of claim 34 wherein the means for copying the original index includes means for copying statistical information associated with the original index.

37. The apparatus of claim 33 further comprising:

means for comparing the new optimization plan with the original optimization plan.

38. The apparatus of claim 33 further comprising:

means for replacing, in the new optimization plan, a reference to the virtual table with the reference to the original table.

39. The method of claim 38 further comprising:

means for displaying the new optimization plan with the reference to the original table.

* * * * *